United States Patent
Suarez et al.

(10) Patent No.: US 7,162,502 B2
(45) Date of Patent: Jan. 9, 2007

(54) SYSTEMS AND METHODS THAT SYNCHRONIZE DATA WITH REPRESENTATIONS OF THE DATA

(75) Inventors: Carlos Garcia Jurado Suarez, Redmond, WA (US); Niall McDonnell, Seattle, WA (US); Jack Joseph J. Greenfield, Redmond, WA (US); Ian M. Bavey, Seattle, WA (US); Jing Fan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 10/796,537

(22) Filed: Mar. 9, 2004

(65) Prior Publication Data

US 2005/0203960 A1   Sep. 15, 2005

(51) Int. Cl.
*G06F 17/00* (2006.01)
*G06F 17/30* (2006.01)
(52) U.S. Cl. .................. 707/203; 707/1; 715/500.1
(58) Field of Classification Search ............ 707/1–2; 715/500.1, 526
See application file for complete search history.

(56) References Cited

U.S. PATENT DOCUMENTS

| | | |
|---|---|---|
| 6,202,085 B1 | 3/2001 | Benson et al. |
| 6,505,200 B1 | 1/2003 | Ims et al. |
| 6,681,370 B1 | 1/2004 | Gounares et al. |
| 2004/0068526 A1* | 4/2004 | Singh .................. 707/203 |
| 2004/0205448 A1* | 10/2004 | Grefenstette et al. ....... 715/500 |

OTHER PUBLICATIONS

H. Singh and J. Han. Modelling software artifacts and their relationships in software engineering environments . Technical Report Jun. 1996, Peninsula School of Computing and Information Technology, Monash University, Melbourne, Australia, 1996. 14 pages.
XML Information Set. http://www.w3.org/TR/xml-infoset/. W3C Recommendation, 2004.
XML Path Language. http://www.w3.org/TR/xpath. W3C Recommendation, 1999.

* cited by examiner

*Primary Examiner*—Alford W. Kindred
(74) *Attorney, Agent, or Firm*—Amin, Turocy, & Calvin, LLP

(57) ABSTRACT

The present invention provides systems and methods that synchronize modifications between electronic data and one or more associated data representations. Synchronization comprises translating modification made to the data or a representation to the representations or the data and other representations. A mapping engine is employed to facilitate modification translation, wherein the mapping engine utilizes data-representation relationships, which declaratively described the relationship between data and respective representations. Such relationships can be stored in markup language (e.g., xml) or as a memory string, for example. Modifications can be translated via a continuous technique, wherein translation occurs upon transaction commitment or via an explicit technique, wherein translation occurs upon an explicit request. The systems and methods further employ an adapter that facilitates communication between the mapping engine and the representation and a handler store that provides various handlers that facilitates communication between the mapping engine and data.

25 Claims, 9 Drawing Sheets

SYSTEMS AND METHODS THAT SYNCHRONIZE DATA WITH REPRESENTATIONS OF THE DATA

TECHNICAL FIELD

The present invention generally relates to data processing, and more particularly to systems and methods that map modifications made to data to a respective representation(s) of the data and modifications made to a representation of the data to the data and other representations of the data in order to synchronize the data with associated representations.

BACKGROUND OF THE INVENTION

Applications (e.g., editors) that can be employed to manipulate electronic data (e.g., documents, images, audio . . . ) often utilize a representation of the data to facilitate modifying (e.g., creating, editing, and removing) all or selective portions of the data. With these applications, the representation typically is generated when a user performs an action (e.g., launches an application and opens a document) that indicates a desire to modify the data. The user can employ the representation to indirectly modify the data via the representation, wherein a modification made to the representation is eventually translated to the data.

After a representation is generated, the data can be directly modified. When the data is modified, the representation no longer reflects a current state of the data so the modification needs to be translated to the representation. Similar to above, the modification is eventually translated to the data representation. In addition, other applications can be concurrently invoked to manipulate the data. These applications can work directly on the data, utilize an existing representation or elicit generation of other representations. Likewise, the above noted modifications (made to the representation and data) must be translated to all other representations and any modification to another representation must be translated to the data and its respective representations in order to synchronize the data with associated representations.

Conventionally, modification translation (for the above scenarios) from data or representation to representation or data is delayed. For example, with many applications the user commits changes, for example, after some period of time or upon exiting the application. However, this type of commitment can introduce delay in the translation, which can result in periods where the data does not reflect the representation and the representation does not reflect the data. The foregoing presents several challenges to ensuring the integrity of the data. For example, when data and an associated representation do not reflect each other, the representation can be utilized to make or attempt to make erroneous modification to the data.

For example, a programmer may desire to modify source code. Upon invoking an editor, a representation of the source code can be generated and utilized by the programmer to edit the source code. For example, the programmer may add a method to a class in the representation. However, if the class is removed from the source code after the representation is generated and the representation is not updated to reflect the class removal, the representation can be modified with the addition of the new method, even though the class no longer exists in the source code. When the modification (the new method) to the representation is eventually translated from the representation to the source code, unexpected and/or undesired results may occur. For example, the method can be erroneously translated and not discovered until the source code is compiled, which can necessitate debugging and undoing the modification. In another example, the invalid translation may cause the application to crash or lock-up. In yet another example, the translation may result in lost code or a corrupt file. In still another example, the invalid translation may occur without an indication, wherein running the executable code may render undesired results.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that synchronize changes between electronic data and one or more representations of the electronic data. For example, a change to the data is mapped to the representations, and a change to one of the representations is mapped to the data and the remaining representations. The systems and methods include a synchronization component that manages and coordinates modification translation between data and representations. The synchronization component can include a bank that stores data-representation relationships (e.g., descriptions of the relationship between data and its representations) that are utilized to map modifications between data and representations. In addition, the synchronization component can include a mapping engine that retrieves suitable data-representation relationships from the bank, facilitates representation generation, and employs the relationships to translate or map modifications between data and representations.

Data representations can represent all the data or portions thereof, and are extensible such that portions of data can be added to the representations as needed, or on demand. The foregoing can improve performance by mitigating power cycle utilization and memory consumption for portions of data that are not affected by the modifications. In addition, mapping can be configured for explicit or continuous synchronization, wherein explicit synchronization translates modifications upon invocation and continuous synchronization dynamically translates modifications as they occur. The systems and methods further provide an adapter that facilitates communication between the synchronization component and a representation and a handler store that facilitates communication between the synchronization component and data.

In one aspect of the present invention, a system that synchronizes electronic data with associated representations is provided. The system comprises a synchronization component that manages and facilitates synchronization of modification translation between data and associated representations. The synchronization component utilizes a data/representation relationship (model), which provides a description of the relationship between data and a representation. This relationship can be utilized to translate a modifications to the data and/or one or more respective representations. Such translation can be based on a continuous (dynamic) or an explicit approach, wherein modifications are translated upon commitment or via an explicit request. The system further comprises a data interface and a representation interface, which facilitate interaction between the synchronization component and the data and data representations, respectively.

In another aspect of the present invention, the synchronization component comprises a map (relationship) bank and a mapping engine. The map bank is utilized to store data-representation relationships, which declaratively describe relationships between a data type and respective representations. The mapping engine can retrieve and utilize these relationships to generate representations and translate modifications between data and associated representations by mapping data related operations to representation operations and vice versa.

In another aspect of the present invention, the system can further comprise a handler store that provides at least one mediation mechanism for meditating between data and corresponding representations. The mediation mechanism includes file handlers, project handlers, configuration handlers, code handlers, assembly handlers, reference handlers, and/or one or more user-defined handlers. The system further comprises an adapter that facilitates communication between the mapping engine and a representation.

In yet another aspect of the present invention, the system further comprises an API and intelligence component. Both components can be utilized to generate and/or provide data-representation relationships to the map bank. For example, the API can be utilized to upload relationship and/or rule sets and/or generate, modify and/or remove relationships and rule sets from the map bank. The intelligence component can be utilized to automatically generate relationships. For example, the intelligence component can be provided with a data type or information regarding the data type, which can be utilized to automatically generate relationships for the data type and associated representations.

In another aspect of the present invention, relationships can be stored in various formats in the map bank. For example, relationships can be stored as a markup language representation such as xml files, xml infosets, and in memory strings. The mapping engine can synchronize data with a respective representation via collaboration of a declarative xml mapping and an element provider implementation. In other aspects of the invention, methodologies are provided for synchronizing data with data representations.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
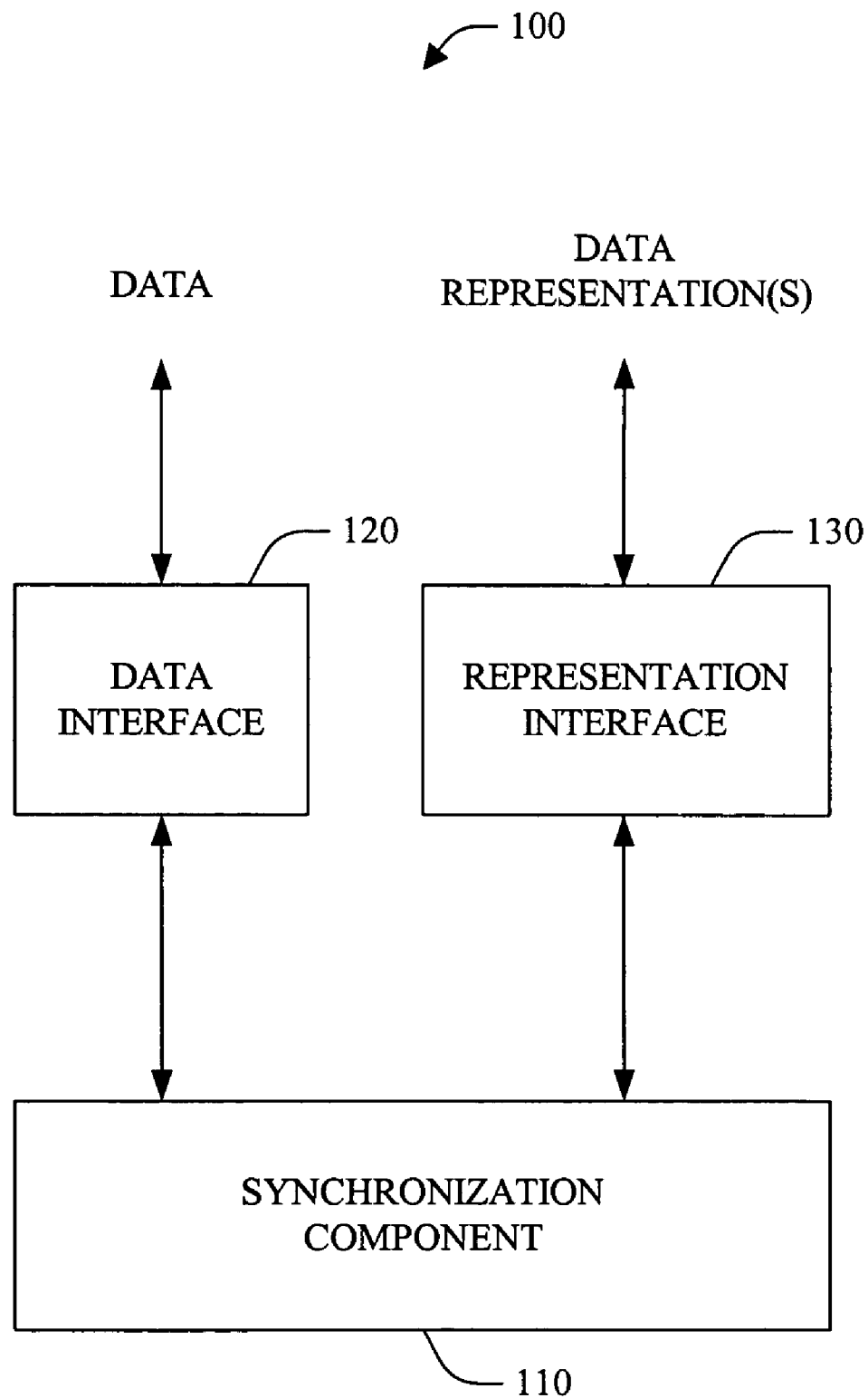
FIG. 1 illustrates an exemplary system that synchronizes electronic data with associated representations.

The present invention provides systems and methods that synchronize electronic data with respective representations (e.g., data models), wherein a modification to the data or a representation is translated to representations or the data, respectively. Translation can occur upon manual invocation by a user making the modification or automatically and seamlessly when a modification is detected. In addition, an on demand approach can be utilized to generate representations, wherein only relevant portions of the data are included in a representation and portions of data can be dynamically included in a representation as it becomes relevant. The foregoing synchronization can mitigate modification errors due to data representations and data not reflecting each other and, thus, the present invention can improve overall integrity, robustness and speed, and reduce power cycle and memory consumption.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component can be, but is not limited to, a process running on a processor, a processor, an object, an executable, a thread of execution, a program, and/or a computer. By way of illustration, both an application running on a server and the server can be a computer component. In addition, one or more components can reside within a process and/or thread of execution, and a component can be localized on one computer and/or distributed between two or more computers. Furthermore, a component can be an entity (e.g., within a process) that an operating system kernel schedules for execution. Moreover, a component can be associated with a context (e.g., the contents within system registers), which can be volatile and/or non-volatile data associated with the execution of the thread.

FIG. 1 illustrates a system 100 that synchronizes electronic data with associated representations. In general, many applications enable a user to create, modify and/or remove electronic data (e.g., word processing documents, spreadsheets, source code, database tables . . . ). In many instances, such manipulation is facilitated by utilizing one or more representations (models) of the electronic data, wherein a change to a representation is mapped to the electronic data and other representations. However, when utilizing data representations an application can expose itself to situations wherein the electronic data can change (e.g., due to a direct change or indirect change (e.g., via another representation)) such that the representation does not reflect current data and vice versa. In this situation, the application can be utilized to unintentionally make invalid, erroneous and/or conflicting changes and/or changes that render undesired and/or unexpected results.

For example, a first application can be invoked to edit source code. After creating a corresponding representation of the source code, a second application can modify (e.g., delete a class from) the source code or a second representation, wherein the modification is mapped to the source code. If this change is not translated to the representation, the first application can be utilized to make a valid modification to the representation that conflicts with the source code. The second application can be utilized to remove a class from the source code. If this removal is not mapped to the representation, the first application can be utilized to add a member or method to the class via the representation. However, such modification is no longer valid since the class no longer exists in the source code. The system 100 can be utilized to mitigate the foregoing, as well as other obstacles related to utilizing a representation to modify electronic data, by synchronizing data and representations such that they reflect each other.

The system 100 comprises a synchronization component 110 that manages and facilitates synchronization of modifications between data and associated representations. The synchronization component 110 synchronizes data and representations via a data/representation relationship, or model, which provides a description of the relationship between data and a representation. This relationship can be utilized to translate a modification made to either the electronic data or the representation thereof to respective representation(s) or electronic data. By way of example, the synchronization component 110 can be configured for a particular type (e.g., text, image, audio, database . . . ) of data by providing or generating and storing a suitable relationship description for a relationship between the data and its corresponding representation(s). When a user attempts to modify data of this type, the synchronization component 110 can retrieve and employ the relationship to create a representation of the data. Such representation can be a complete representation of the data or a partial representation, wherein relevant portions (e.g., portions affected by the modification) of the data are represented. Additionally, it is to be appreciated that partial representations can be updated as portions become relevant.

The user can modify the representation, wherein the modification can be translated to the data dynamically and/or explicitly, for example, to synchronize the data and representation. Dynamically generally refers to detecting a change and automatically updating data upon commitment, and explicitly generally refers to initiating a transaction on the representation to update the data. It is to be appreciated that the synchronization component 110 can additionally be utilized to map changes made directly to the data to the representation. For example, after a representation is created, the data can change, wherein the synchronization component 110 can employ the relationship to map any modification made to the data. Thus, the user employing the representation is provided with a current view of the data, which mitigates making invalid, erroneous and conflicting changes due to editing an inaccurate representation.

The system 100 further comprises a data interface 120 and a representation interface 130. The data interface 120 provides a mechanism for the synchronization component 110 to interact with one or more sets of data in order to obtain information about and/or update the data. Likewise, the representation interface 130 provides a communication channel. This channel can be utilized to interact with one or more data representations (e.g., for various languages) to convey changes made to the representation to update the data and/or update the representations.

Figure 2:
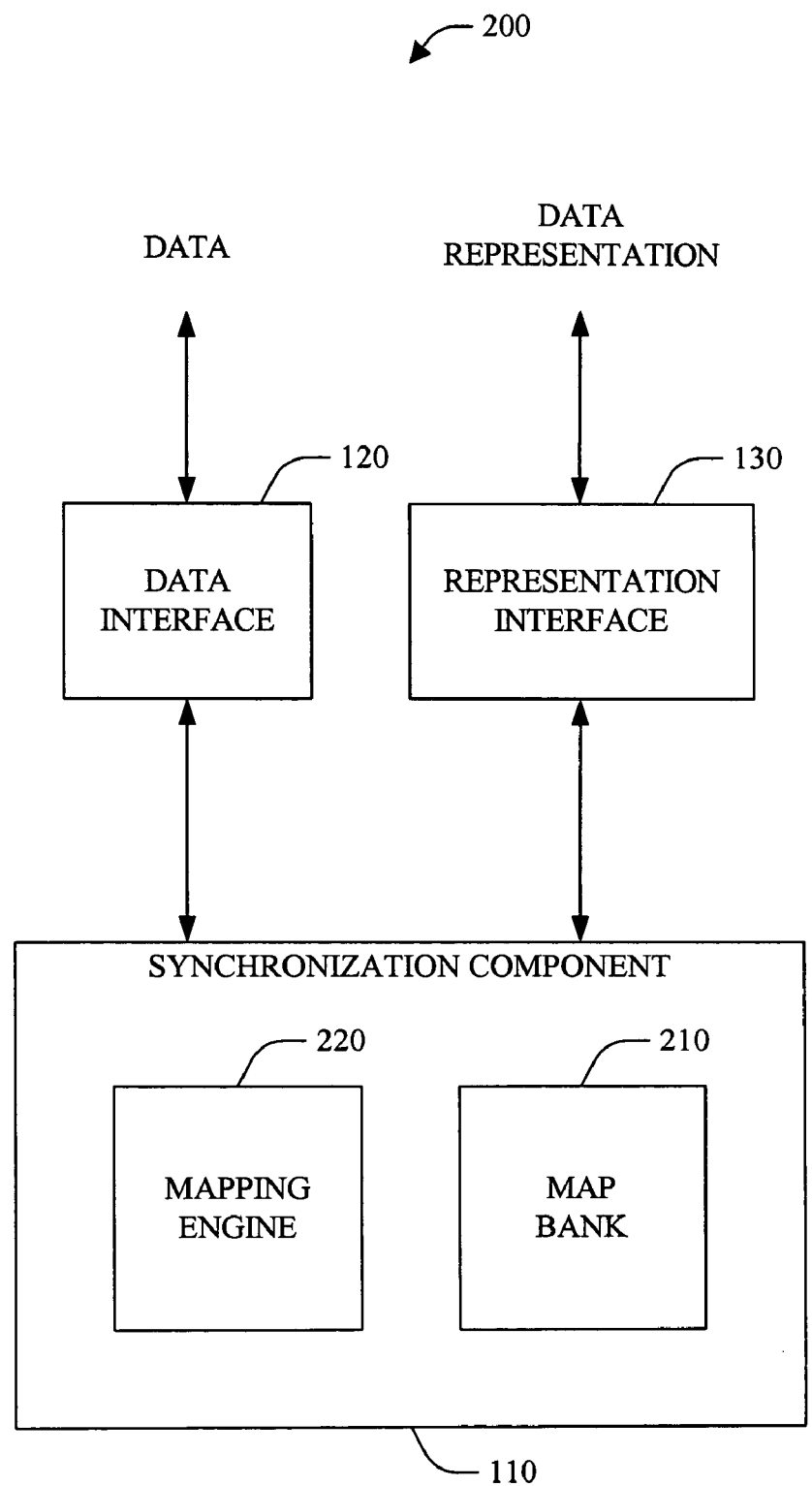
FIG. 2 illustrates an exemplary system that employs a mapping engine to synchronize data and associated representations.

FIG. 2 illustrates a system 200 that synchronizes electronic data with representations of the data. The system 200 comprises the synchronization component 110, the data interface 120 and the representation interface 130, wherein the synchronization component 110 comprises a map bank 210 and a mapping engine 220. The map bank 210 can be utilized to store the data-representation relationships. As described above, such relationships (models) provide descriptions, which can declaratively describe relationships between a data type and respective representations. Such declarations can be provided via markup language (e.g., xml files or infosets) and/or memory strings, for example. The mapping engine 220 can obtain relationships from the map bank 210 and utilize the relationships to generate representations and synchronize data and associated representations. For example, the mapping engine 220 can retrieve and utilize a relationship to map data related operations to representation operations. Such mapping provides the mapping engine 220 with the ability to translate a modification made to the data or representation to respective representations or data.

Figure 3:
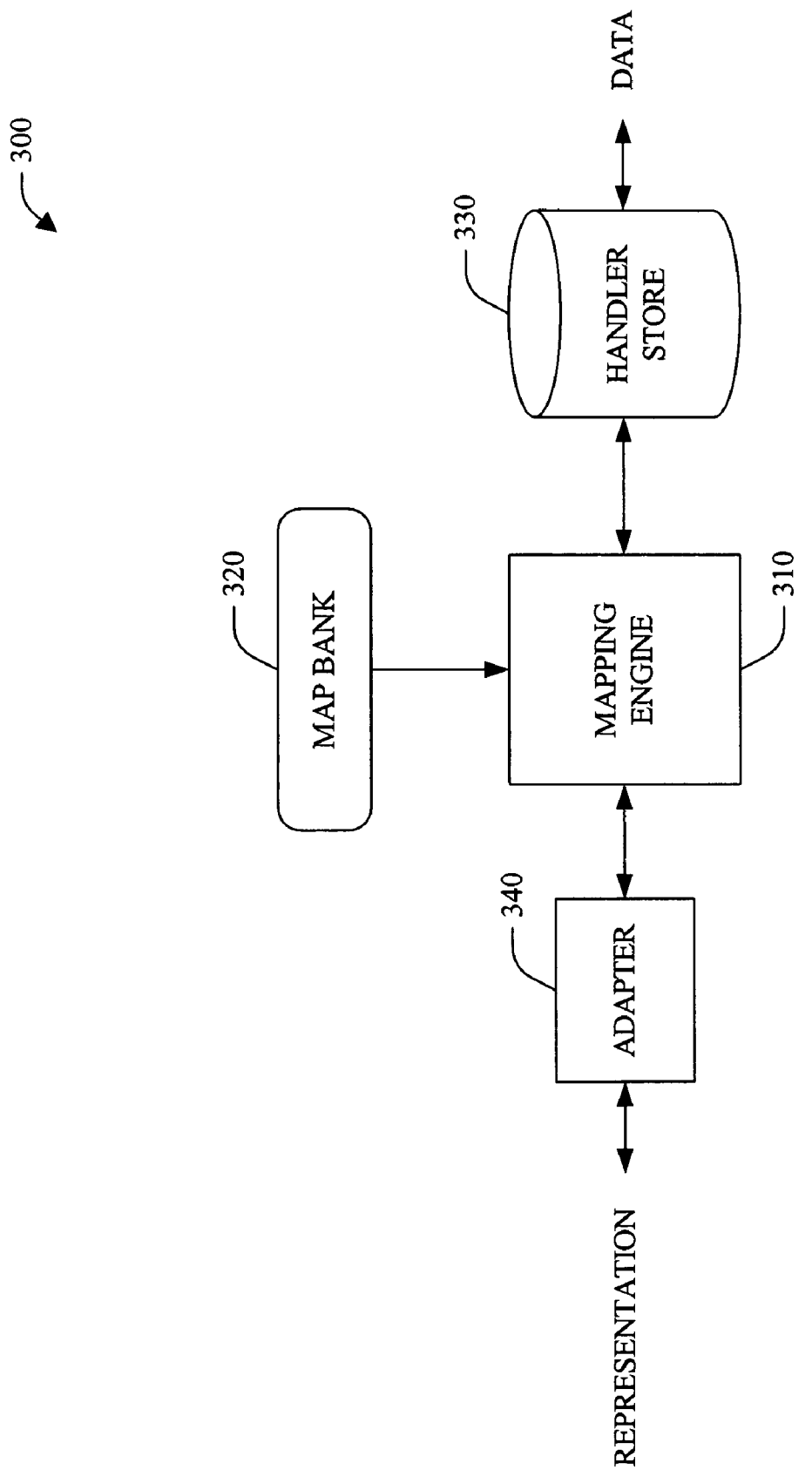
FIG. 3 illustrates an exemplary synchronization system that translates modifications between data and associated representations.

FIG. 3 illustrates a system 300 that synchronizes electronic data with an electronic representation of the data. The system 300 comprises a mapping engine 310, a map bank 320, a handler store 330 and an adapter 340. The mapping engine 310 and map bank 320 can be substantially similar to the synchronization component 110 described above. For example, a relationship or mapping for a data type can be generated and stored in the map bank 320. This relationship can be retrieved in response to a request to edit data. For example, when a user attempts to modify the data, the map bank 320 can be searched to determine whether a suitable mapping exists. This determination can be facilitated by intelligence such as inference engines, classifiers and/or probabilities. In addition, the intelligence can be employed to select a "best" mapping when an associated mapping is absent. Upon locating a suitable mapping, the mapping can be utilized to generate the data representation (e.g., full or partial), which can then be modified. The mapping can then be utilized by the mapping engine 310 to promulgate modifications to the data or data representation to an associated representation or data, as described herein.

Typically, synchronization by the mapping engine 310 can be facilitated by one or more handlers stored in the handler store 330. Such handlers can provide a mediation mechanism between data and corresponding representations. Examples of handlers that can be employed in connection with the present invention include file handlers, project handlers, configuration handlers, code handlers, assembly handlers, reference handlers, and/or one or more user-defined handlers. The adapter 340 can be utilized to facilitate mapping between the mapping engine 310 and a representation by mapping to one or more elements of the representation.

The system 300 can employ one or more services that facilitate synchronization. For example, a demand load service can be utilized to generate representations that comprise selective portions of the data. For example, in many instances a modification affects a portion of data rather than all the data. With these instances, it can be advantageous to represent only the portions of interest. The foregoing can reduce the number of processing cycles and memory consumed and can improve performance (e.g., speed). The demand load service is extensible such that if a portion of data becomes relevant after a representation is generated, the representation can be expanded to include portion. In addition, portions that become non-relevant can be removed from the representation.

A transacted synchronization service enables the user to determine when modifications are synchronized. For example, the user can make one or several modifications to data or a representation and then invoke the service to update respective representations or data. Typically, this service employs an all or nothing technique wherein either all modifications are mapped or no modification is mapped. Thus, if several modifications are successfully mapped to data or one or more representations and then a modification fails, mapped modifications are rolled back. The foregoing ensures integrity and reliability by not allowing modifications to be translated unless the entire transaction is successful.

In various aspects of the invention, this service is configurable such that successfully mapped modifications are committed even if there are unsuccessful mappings. This enables the user to determine whether modifications are mapped when a transaction of mappings cannot be successfully mapped. Thus, if a user knows that a particular modification is independent of other modifications, the user can accept a successful mapping regardless of whether the other modifications are successfully mapped. In addition, a user may be willing to accept a risk associated with one modification being successfully mapped while another modification is not mapped.

A continuous synchronization can be employed to continuously and dynamically translate modifications. For example, this service can detect when a modification is made and then determine the modification. This information can be translated to a suitable syntax and a suitable relationship between relevant data and associated representations can be retrieved. The information can then be mapped to one or more model elements of the representation. A transaction can be created wherein the modification is mapped.

Figure 4:
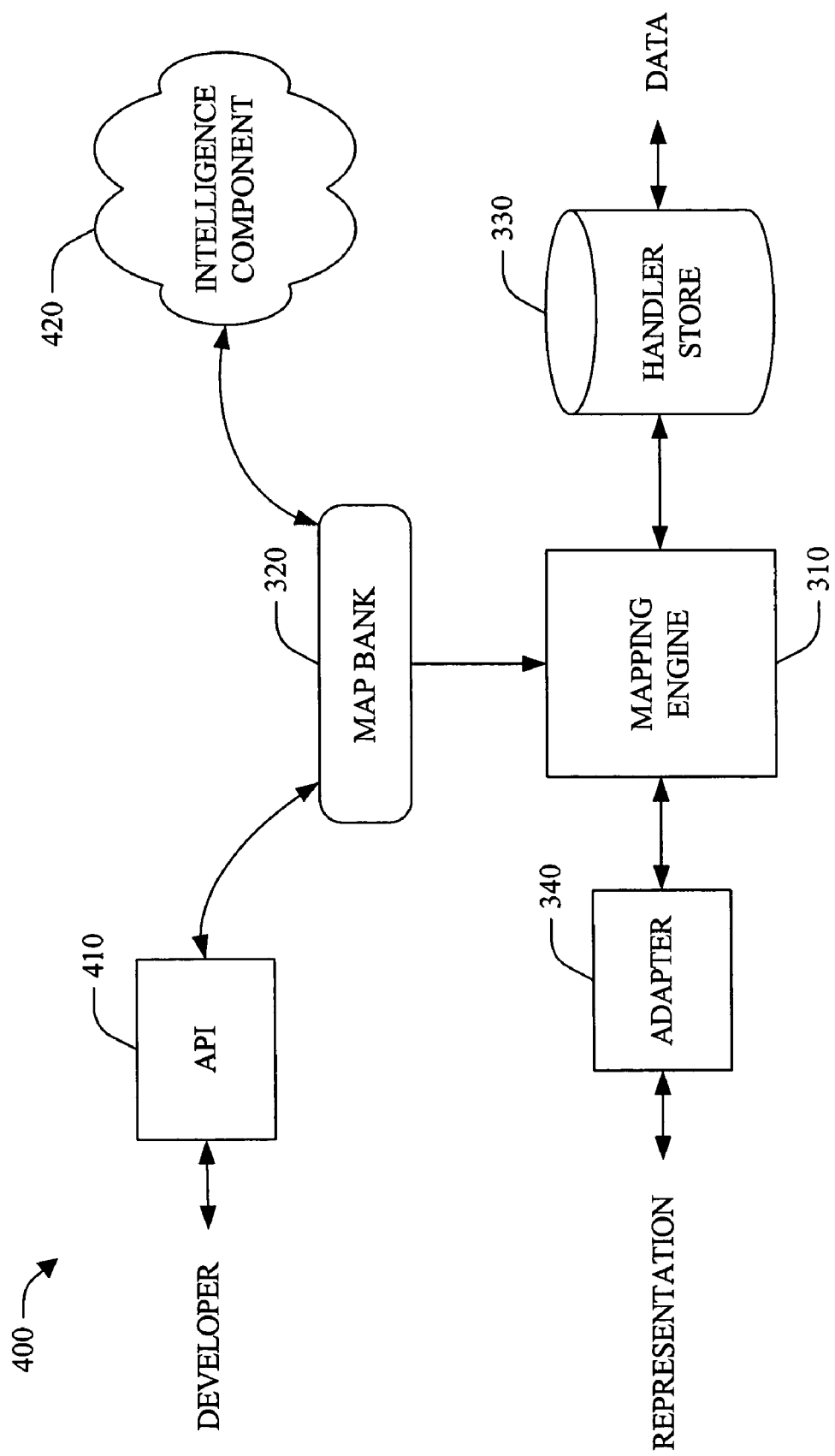
FIG. 4 illustrates an exemplary intelligent synchronization system.

FIG. 4 illustrates a system 400 that synchronizes electronic data with an electronic representation of the data. The system 400 comprises the mapping engine 310, the map bank 320, the handler store 330, the adapter 340, an application program interface (API) 410 and an intelligence component 420. The API 410 and intelligence component 420 can be utilized to generate and/or provide data-representation relationships to the map bank 320. For example, a developer can define a relationship and/or a rule set for a relationship and convey the relationship and/or rule set to the map bank 320 via the API 410. In addition, the API 410 can be utilized to generate, modify and/or remove a relationship from the map bank 320.

The intelligence component 420 can be utilized to automatically generate relationships. For example, the intelligence component 420 can be provided with a data type or information regarding the data type, wherein the intelligence component 420 utilizes this information to automatically generate a relationship. It is to be appreciated that the intelligence component 420 can employ statistics, inferences, probabilities and classifiers (e.g., explicitly and implicitly trained), including but not limited to, Bayesian learning, Bayesian classifiers and other statistical classifiers, such as decision tree learning methods, support vector machines, linear and non-linear regression and/or neural networks to facilitate such automation.

Figure 5:
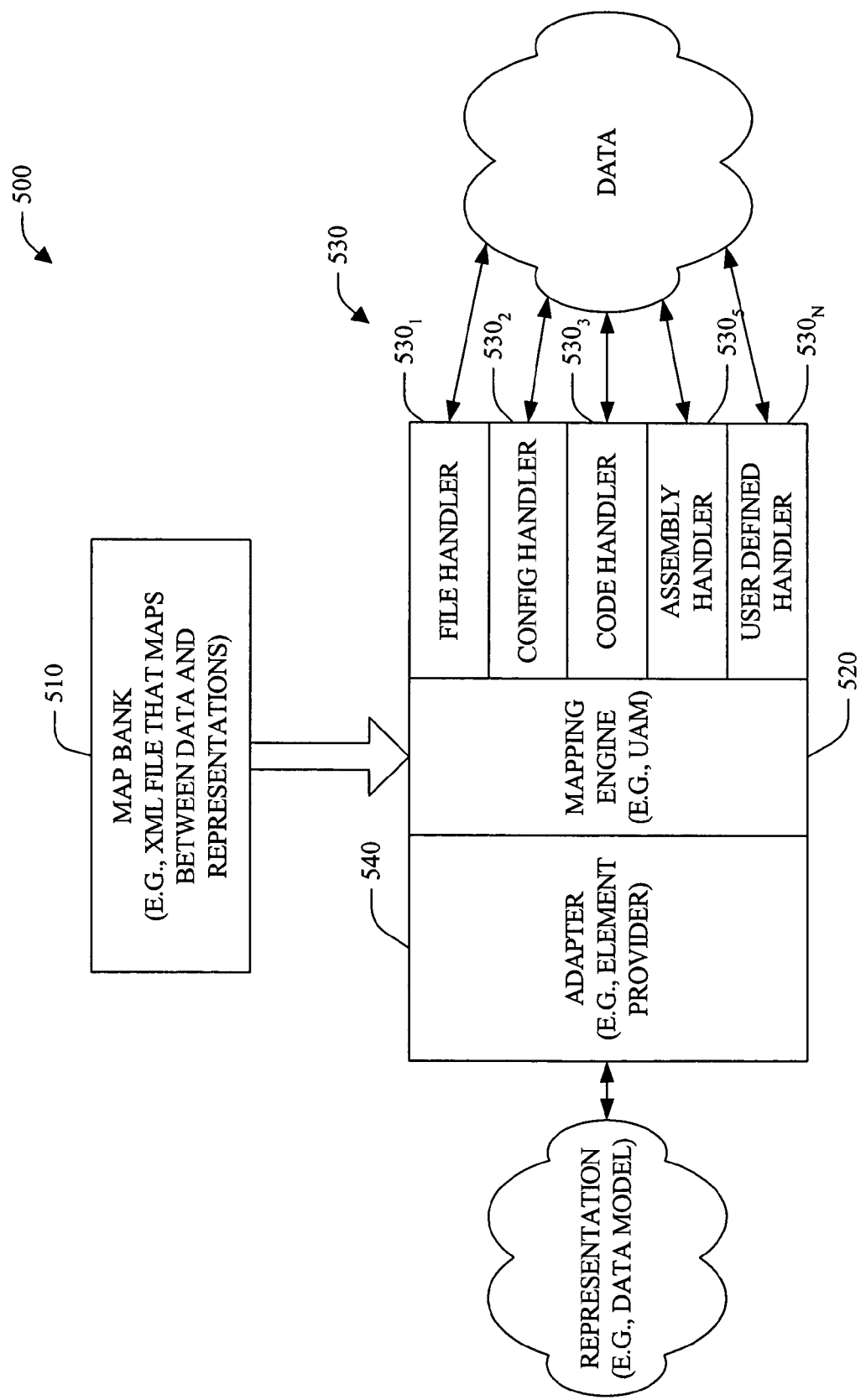
FIG. 5 illustrates exemplary handlers that facilitate data-representation synchronization for a synchronization system.

FIG. 5 illustrates a synchronization system 500 that synchronizes data with a representation of the data. The system 500 comprises a map bank 510 that stores relationships between data and associated representations. The relationships can be, for example, mappings that map data related operations to representation operations. The relationships can be stored via various formats. For example, such relationships can be stored as markup language such as XML files and in memory strings.

The relationship can be utilized by a mapping engine 520 to facilitate mapping between data and a respective representation. For example, when a request to modify data is received, a suitable mapping can be obtained from the map bank 510. As noted above, the mapping can be utilized to map data related operations to representation operations. Employing the retrieved mapping, a representation of the data can be generated. When a modification is made to either the data or the representation, the mapping engine 520 can employ the mapping from the map bank 510 to update the corresponding representation or data.

A handler store 530 can be utilized to facilitate conveyance of information. As depicted, the handler store 530 comprises N services (where N is an integer), including a file handler $530_1$, a configuration (config) handler $530_2$, a code handler $530_3$, an assembly handler $530_4$, and a user defined handler $530_N$. It is to be appreciated that only a subset of suitable handlers are provided for sake of brevity and clarity, and that various other handlers can be employed in accordance with aspects of the present invention. For example, a project handler, a reference handler, and one or more additional user defined handlers can be utilized.

An adapter 540 can be utilized to facilitate mapping between the mapping engine 520 and a representation by providing one or more elements. Thus, the mapping engine 520 can synchronize data with a respective representation (synchronizing model elements) via collaboration of a declarative XML mapping (file or string) and the adapter 540. A user can configure the system 500 to support a new data type by configuring the mapping engine 520 such that it essentially maps operations on data to xml infoset operations that can be utilized to create a (internal) representation of the data as a mapping target. Such approach is simple and can provide a regular structure, but is expressive such that it can be utilized to represent a large number of data types.

Figure 6:
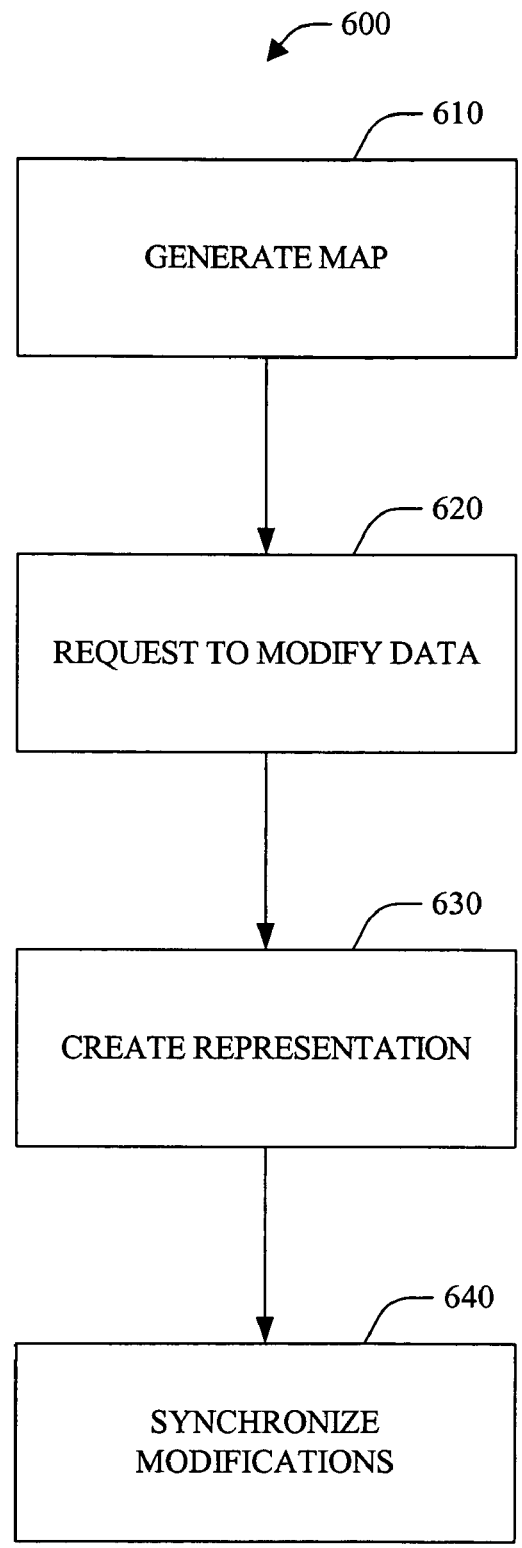
FIG. 6 illustrates an exemplary methodology for synchronizing modifications between data and data representations
Figure 7:
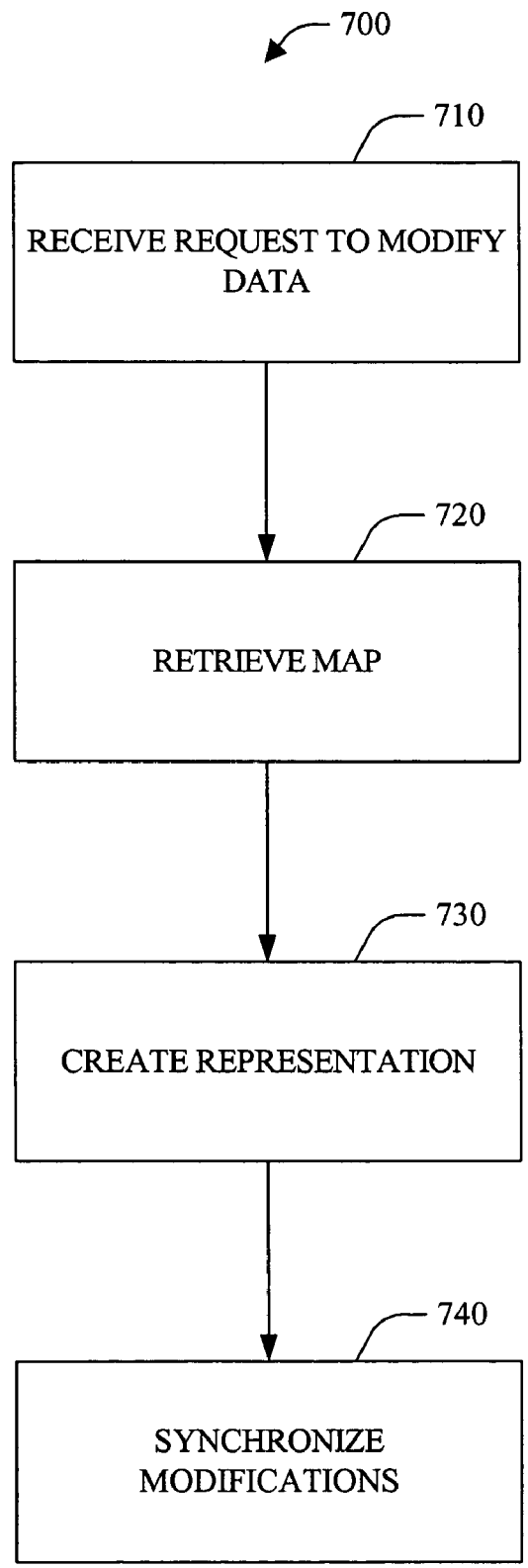
FIG. 7 illustrates an exemplary methodology for synchronizing modifications between data and data representations.

FIGS. 6–7 illustrate methodologies 600 and 700 in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

FIG. 6 illustrates an exemplary methodology 600 that synchronizes data with a representation of the data. At reference numeral 610, a map for a data type is generated.

This map can declaratively describe a relationship between the data type and an associated representation(s). As described above, such maps can be created by a developer, wherein the developer can define the syntax and/or mapping or via intelligence, such that the map can be automatically generated based on the data type or associated properties. At reference numeral 620, a request to modify data via a representation is received. Such request can be invoked by launching an application that can be utilized to edit data and opening the data. Such request elicits a search of a map bank for a suitable map. If a map is located, the map is retrieved. If a map in no present, intelligence can be utilized to dynamically generated a map or select a "best" map from existing maps.

At 630, the map can be utilized to generate a representation of the data. The representation can represent all the data or a subset thereof, for example, portions that are affected by the modification. A demand loading technique can be utilized such that if additional portions of the data are required, the representation can be extended to include these portions. At reference numeral 640, a modification to the data or representation is translated to a respective representation or data. For example, a modification can be made to the representation, wherein the modification is detected and tracked. The modification can be compared (e.g., a difference technique) with an unmodified version to determine what was modified. Both the modified and unmodified versions can be depicted in a suitable syntax (e.g., xpath) and provided to a mapping engine. The mapping engine can utilize the corresponding relationship map to map the modifications to elements of the model, which facilitate changing the properties. A transaction can be created on the model, wherein affected portions can be replaced with updated portions. When the transaction closes, the data and associated representation are synchronized.

FIG. 7 illustrates an exemplary methodology 700 that synchronizes data with a representation of the data. At reference numeral 710, a user invokes an application to modify data (e.g., source code). Upon the invocation, a relationship between the data and a representation of the data is retrieved. In instances where a relationship does not exist, a relationship can be generated. Such relationship can be utilized to map data-related operations to representation related operations. At reference numeral 730, a representation of the data is created. The user can employ the representation to make modifications to the data. It is to be appreciated that the data can be directly modified and that other representations can be created for the data.

At reference numeral 740, the data or representation can be synchronized. For example, the data or representation can be modified. Upon detecting the modification or being notified that a modification has occurred, the modification can be determined. For example, a difference between an unmodified version and a modified version can be obtained, wherein the difference provides an indication of what was modified a mapping engine can utilize this difference along with a suitable data-representation relationship to translate the modification. After translation, the data and associated representation are synchronized.

Exemplary Artifact Map and Element Provider

The following xml pseudo code illustrates one particular example wherein the novel aspects of the invention can be employed. When a plug-in wants to extend a set of supported data types to include one or more new meta-types, it can be advantageous to synchronize model elements with underlying data. In this case, the plug-ins can employ the system described herein to manage mapping and synchronizing tasks. This can be initiated by creating a mapping and an element provider (e.g., a class or derived class), that are employed in conjunction to instruct a mapping engine (e.g., a unified artifact mapper) regarding how to keep a set of model elements in sync with corresponding data. In this example, the artifact map is an xml document that specifies the mapping.

Example Artifact Map

```
<mappingsCollection xmlns="http://microsoft.com/Mappings.xsd">
  <mappings moniker="Microsoft.ClassDesigner" majorVersion="1" minorVersion="0" versionRevision="0">
    <handlers>
          <handler name="project"
type="Microsoft.VisualStudio.EnterpriseTools.ArtifactMapper.ProjectHandler,
Microsoft.VisualStudio.EnterpriseTools.Shell, Version=8.0.1000.0,
Culture=neutral,PublicKeyToken=b03f5f7f11d50a3a" />
          <handler name="code"
type="Microsoft.VisualStudio.EnterpriseTools.ArtifactMapper.CodeHandler,
Microsoft.VisualStudio.EnterpriseTools.Shell, Version=8.0.1000.0,
Culture=neutral,PublicKeyToken=b03f5f7f11d50a3a" />
    </handlers>
    <artifactMap
modelElementType="Microsoft.VisualStudio.EnterpriseTools.ArtifactModel.Clr.ClrNamespace"
xpath="//namespace" handler="code" generates="true">
        <propertyBinding>
          <property name="Name" xpath="@name" key="true" />
          <property name="IsRootNamespace" xpath="@isRootNamespace" />
          <property name="ProjectGuid" xpath="/project/project/@ProjectIDGuid" />
        </propertyBinding>
        <relationships>
          <relationship parentOrder="0"
modelElementType="Microsoft.VisualStudio.EnterpriseTools.ArtifactModel.Clr.
ClrNamespaceContainsLogicalElements" key="true">
            <rolePlayers>
              <rolePlayer roleIndex="0" xpath="parent::namespace" />
              <rolePlayer roleIndex="1" />
            </rolePlayers>
```

```
        </relationship>
    </relationships>
</artifactMap>
<mappings>
</mappingsCollection>
```

The following provides brief descriptions of one or more of the fields in the above xml pseudo-code.
mappingsCollection: This is a top level container for mappings which specifies the schema utilized.
mappings: This groups a set of mappings. Normally there is one mappings node per meta-model.
moniker: This is an identifier for a meta-model
majorVersion: This defines major version information for the map.
minorVersion: This defines minor version information for the map
versionRevision: This specifies the version revision for the map
handler: This defines a handler factory that can be utilized in the artifact map by giving it a name and specifying the strong name of a factory Type that can be employed to create instances of the handlers.
artifactMap: This is the main section. There is one per model element type/handler combination. The pair modelElementType/handler should be unique.
modelElementType: This is the full name of the model element type for this map
handler: This is the name of a registered handler that can be utilized to synchronize artifacts mapped to this element type. The name should match a registered handler name from the <handlers> section.
xpath: The provides the xpath query that the handler will be given. It can be utilized to determine which kind of artifact to generate when forward engineering this model elements (if generates="true").
generates (bool): This is set to true if this kind of model elements should be forward engineered. The default is false. This field allows certain model elements to be reverse engineered (e.g., types loaded from referenced assemblies like System.Object).
propertyBinding: This specifies the set of properties that are mapped between the model element and the artifact.
property
  name: This provides the name of the property on the model element.
  xpath: This provides the xpath to the attribute containing the desired value.
  key: This is set to true if this property forms part of this mel's "primary key". A set of key properties need to be unique within their parent element.
contextVariables: These variables are utilized to capture temporary values. Such variables can be utilized as Xslt context variables in the model xpath).
contextVariable
  name: This provides the name of the variable
  xpath: This defines the xpath to the attribute containing the desired value.
relationship: This defines a link that needs to be established from this model element to another at forward and reverse engineering time.
modelElementType: The is the type of ModelElementLink to create key (bool): This is true if this is going to be considered the model element's parent for the purposes of resolving equality among key properties.
rolePlayer: This specifies the role players for this relationship
rolePlayer: This is one of the role players in the relationship. If both xpath and model xpath are omitted it is assumed that the role player is the current element for which links are being created. At most, one of xpath or modelXPath can be utilized in a single <rolePlayer>
roleIndex: This is an index of the role for this player in the relationship.
xpath: This is an xpath (relative to the current artifact xpath) utilized to navigate to the role player. The artifact xpath is executed and then the UAM looks up a model element that is mapped to this artifact.
modelXPath: This is an IMS xpath relative to the root elements returned by the element provider. The modelXPath should only be utilized when the related element is either not mapped at all by the UAM or is mapped to an artifact served by a different handler (e.g., linking a ClrClass (handler=code) to a VSProject (handler=project).

Element Provider

The elementProvider serves as an adaptor between the UAM and the meta-model being mapped. The ElementProvider base class has the following virtual/abstract methods:
  public virtual ModelElement CreateElement(string typeName). This is called whenever a model element needs to be created. This method can be overridden for doing any special initialization.
  public virtual void DeleteElement (ModelElement mel).
  public virtual object GetProperty (ModelElement mel, string name).
  public virtual void SetProperty (ModelElement mel, string name, object propertyValue).
  public virtual void SynchronizationComplete(SynchronizationStatusEntry[] statusEntries). This is called when synchronization is complete. The statusEntries array can include information about the synchronization status for each model element. This method is called within the synchronization IMS transaction.
  public virtual void BeforeSynchronization() This is called before the synchronization transaction starts.
  public virtual void AfterSynchronization (). This is called after the synchronization transaction commits or aborts.
  public abstract Guid GetMetaClassGuidForElementRoot (string melType). For the given model element type, return the MetaClassGuid for the model elements that should be utilized as root nodes for executing modelXPath(s).

```
public class SynchronizationStatusEntry
{
    public ModelElement Modelelement{get;}
```

-continued

```
        public ElementSynchronizationStatus Status{get;}
        public SynchronizationException Exception{get;}
}
public enum ElementSynchronizationStatus
{
        Succeeded,
        Failed,
        Skipped
}
```

Technique for Writing an Artifact Handler

Artifact (e.g., electronic data) handlers can be utilized to present an artifact to a UAM (e.g., mapping engine) as a virtual xml document. An example of a suitable "languages" that can be employed between the UAM and the handlers is xpath. The underlying "schema" for an xml document and associated xpaths can be defined by a handler. Plug-ins may write a new handler if they need to map to an artifact not covered by a current handler (e.g., CodeHandler, AsmxHandler, ConfigHandler, ProjectHandler, ReferenceHandler, AssemblyHandler, FileHandler). The following outline illustrates an artifact handler.

```
public abstract class ArtifactHandler
{
    // constructor
    protected ArtifactHandler(string name, IArtifactScope scope);
    // This typically is called by the Artifact Mapping Engine to
    discover artifacts
    public abstract void WalkArtifact(string rootXPath, ICollection
    queries);
    // Explicit create method, this can return xpath for a created
    artifact.
    public abstract CreatedArtifact CreateArtifact(string parentXPath,
    string
childXPath, Hashtable artifactProperties);
    // Exemplary explicit property set method.
    public abstract bool SetArtifactValue(Query query, object
    newValue);
    // Exemplary explicit Delete method.
    public abstract DeleteResult DeleteArtifact(Query query);
    //This can receive and run xpath queries
    public virtual XPathNodeIterator ExecuteQuery(Query query)
    /*
    For a node type the handlers can indicate to the UAM which
    are the identifier attributes for this kind of node.
    */
    public abstract string[ ] GetIdentifierAttributes(string nodeType);
    /* This can notify handler that the UAM is about to make one
    or more calls to update the artifact*/
    public virtual void BeginUpdate( )
    { }
        // This can notify handler that the UAM has finished updating the
    artifact public virtual void EndUpdate( )
    { }
    // This can be called to roolback a handler change.
    public virtual void RollbackChange(ArtifactMappingEngine
mappingEngine, ArtifactChange entry);
        public string Name { get { return name; } }
    // This can return a key into the artifactProperties Hashtable that
    can be used to
retrieve CustomData that the handler copied before a modelelement was
deleted.*/
        public static object CustomUndoDataKey;
    // The scope this handler operates in.
        public IArtifactScope Scope;
}
```

The following illustrates an exemplary class that can be utilized with the foregoing artifact handler.

```
class Query
{
        string xpath;
        QueryContext context;
}
// The can indicate the return value from ArtifactHandler.DeleteArtifact.
public class DeleteResult
{
    public DeleteResult(object undoData, bool artifactDeleted);
    public virtual object UndoData;
    public virtual bool ArtifactDeleted;
}
/// The can indicate the return value from ArtifactHandler.
CreateArtifact.
public class CreatedArtifact
{
    public CreatedArtifact(string xpath, Hashtable properties, bool
    artifactCreated);
    public virtual string XPath;
    public virtual Hashtable Properties;
    public virtual bool ArtifactCreated;
}
/// This can encapsulate the "scope" at which an artifact operates.
public interface IArtifactScope
{
    /// This can return true if the scope is the same as this scope.
    bool Equals( IArtifactScope scope );
    /// This can return true if this scope is empty
    bool IsEmpty( );
    /// Scopes overlap if
    /// 1. they are the same or
    /// 2. one is at a higher level in the same tree
    bool Overlaps( IArtifactScope scope );
}
```

The following illustrates an exemplary ArtifactHandlerFactory that can be utilized with the foregoing artifact handler.

```
    /// The UAM can create a single instance of each
        ArtifactHandlerFactory and use it to
get instances of individual handlers.
        /// The handler factories can decide how many handlers to create for a
        given scope.
For example, the code handler factory would
        /// create one handler per project if it got passed a solution scope.
        public abstract class ArtifactHandlerFactory
        {
            // constructor
            protected ArtifactHandlerFactory(string name);
            /// The name of this type of handler (like "code" or "config")
            public string Name;
/* This can be called when a designer registers a new scope (for example,
AD is opened and registers solution scope. Handler factories can create
handlers instances here.*/
            public abstract void RegisterScope(IArtifactScope scope);
            // This can be called when a scope is no longer registered.
            public abstract void UnregisterScope(IArtifactScope scope);
            // This can be called to return handler instances.
            public abstract ArtifactHandler[ ] GetHandlers(IArtifactScope
            scope);
            // Helper method to obtain a single handler for the given scope
            (project scope)
            public virtual ArtifactHandler GetSingleHandler(IArtifactScope
            scope);
            // This can be called when a new scope has been created.
            public abstract void OnAfterOpenScope(IArtifactScope newScope);
            /// This can be called before a scope is closed..
            public abstract void OnBeforeCloseScope(IArtifactScope
            newScope);
}
```

In addition to this, the handler is responsible for tracking changes to its artifacts and for reporting them to the UAM by calling IArtifactMapper.ArtifactChanged/Added/Removed. For example, if a class gets added to the code the code handler would call:

```
ArtifactMappingEngine.GetArtifactMapper( ).ArtifactAdded
("/namespace[@name='Foo']/class[@name='Bar']", this,
(Hashtable)properties);
```

Figure 8:
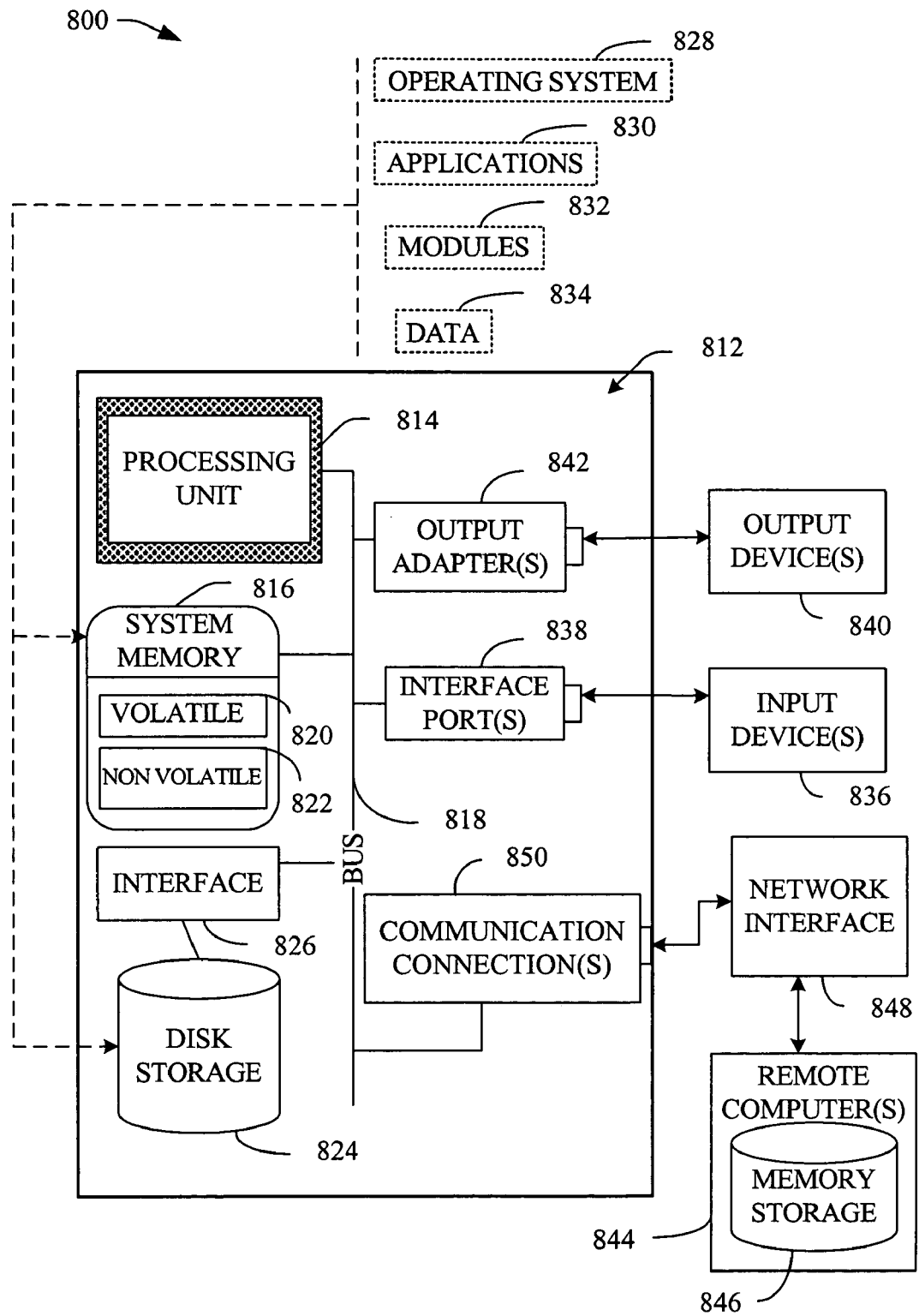
FIG. 8 illustrates an exemplary operating environment, wherein the novel aspects of the present invention can be employed.
Figure 9:
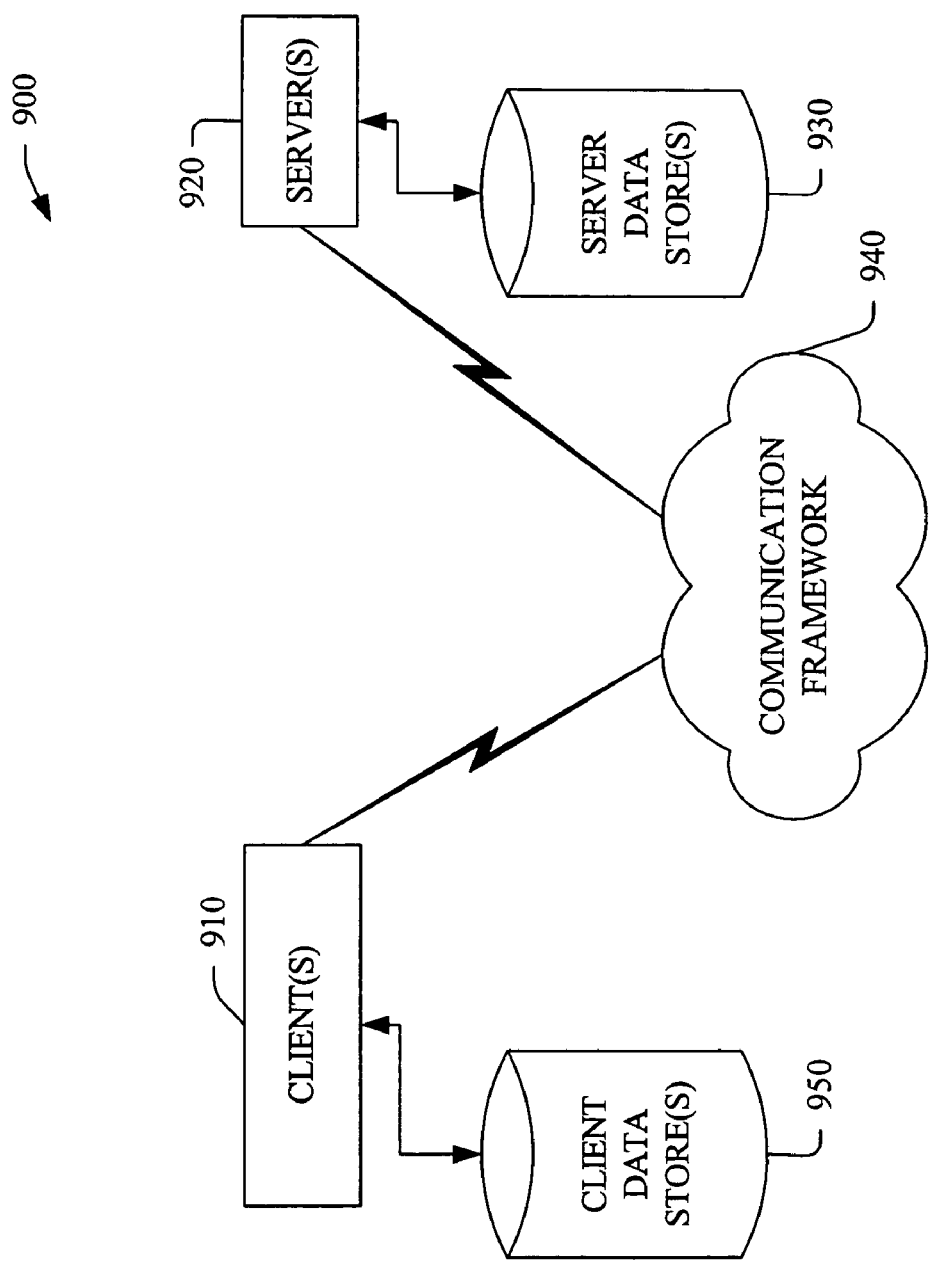
FIG. 9 illustrates an exemplary networking environment, wherein the novel aspects of the present invention can be employed.

In order to provide a context for the various aspects of the invention, FIGS. 8 and 9 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 920. The server(s) 920 can also be hardware and/or software (e.g., threads, processes, computing devices). The servers 920 can house threads to perform transformations by employing the present invention, for example. One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 940.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that synchronizes electronic data and representations of the electronic data comprising:
    a map bank that stores relationships between the electronic document and the representations, the relationships provide descriptions which declaratively describe the electronic document and the representations, and wherein the representations comprise at least one of a complete representation and a partial representation of the electronic document; and
    a mapping engine that retrieves suitable relationships from the map bank, facilitates representation generation, and utilizes at least one relationship to synchronize the electronic data and the representations such that a modification to the electronic data is mapped to the representations and a modification to a representation is mapped to the electronic data and the remaining representations, wherein the modification is translated to the electronic data dynamically by automatically updating the electronic data upon commitment or explicitly by initiating a transaction on the representation to update the electronic data.

2. The system of claim 1, further comprising a store that provides one or more handlers that mediate between the mapping engine and the data.

3. The system of claim 2, the one or more handlers comprise one or more of a file handler, a project handler, a service handler, a configuration handler, a code handler, an assembly handler, a reference handler and a user defined handler.

4. The system of claim 1, further comprising an adapter that facilitates mapping between the representations and the mapping engine.

5. The system of claim 1, the mapping comprises mapping electronic data operations to xml infoset operations.

6. The system of claim 1, the relationships are stored as markup language representations.

7. The system of claim 6, the markup language representation is one of an xml file and a memory string.

8. The system of claim 1, further comprising a service bank that provides one or more services that facilitate synchronization.

9. The system of claim 8, the one or more services comprise at least one of an explicit synchronization service, a continuous synchronization service, and a demand loading service.

10. The system of claim 1, respective relationships are defined to support one of a single data type associated with a representation; a single data type associated with a plurality of representations; a plurality of data types associated with a plurality of representations; and a plurality of data types associated with a single representation.

11. The system of claim 1, further comprising an intelligent component that facilitates generating relationships.

12. The system of claim 1, further comprising an API that facilitates at least one of uploading relationships to the map bank and generating relationships in the map bank.

13. A method that synchronizes electronic data with respective representations, comprising:
- receiving a request to modify electronic data;
- locating a relationship between the electronic data and one or more representations, the relationship provides descriptions which declaratively describe the electronic data and the one or more representations;
- generating at least one representation of the electronic data, wherein the representation comprises at least one of a complete representation and a partial representation of the electronic data; and
- employing the relationship to translate modifications made to the electronic data to the at least one representation and to translate modifications made to a representation to the electronic data and the remaining representations, wherein the modifications are translated to the electronic data dynamically by automatically updating the electronic data upon commitment or explicitly by initiating a transaction on the representation to update the electronic data.

14. The method of claim 13, further comprising detecting that a modification has been made and determining the modification by comparing an unmodified version with the modified version.

15. The method of claim 14, further comprising employing a handler to detect and determine the modification.

16. The method of claim 14, further comprising employing one of an explicit synchronization and continuous synchronization approach to translate the modification.

17. The method of claim 13, further comprising rolling back the modification as an error occurs.

18. A method that synchronizes electronic data with respective representations, comprising:
- generating a representation of electronic data, wherein the representation comprises at least one of a complete representation and a partial representation of the electronic data;
- modifying the representation;
- obtaining a mapping between the electronic data and the representation; and
- translating the modification made to the representation to the electronic data based on the mapping in order to synchronize the electronic data and the representation, wherein the modification is translated to the electronic data dynamically by automatically updating the electronic data upon commitment or explicitly by initiating a transaction on the representation to update the electronic data.

19. The method of claim 18, the mapping comprises mapping electronic data operations to representations operations.

20. The system of claim 18, further comprising modifying the data and translating the modification made to the electronic data to the representation based on the mapping.

21. The method of claim 18, further comprising generating one or more additional representations of the electronic data, wherein a modification to the electronic data is translated to all the representations and a modification to a representation is translated to the data and the remaining representations.

22. The method of claim 18, further comprising utilizing intelligence to generate electronic data-representation relationships.

23. A data packet transmitted between two or more computer components that facilitates synchronizing electronic data with a respective representation, comprising:
- generating a representation of electronic data, wherein the representation comprises at least one of a complete representation and a partial representation of the electronic data; modifying the representation; obtaining a mapping between the electronic data and the representation; and translating the modification made to the representation to the electronic data based on the mapping in order to synchronize the electronic data and the representation, wherein the modification is translated to the electronic data dynamically by automatically updating the electronic data upon commitment or explicitly by initiating a transaction on the representation to update the electronic data.

24. A computer readable medium storing computer executable components to facilitate synchronizing electronic data with a respective representation, comprising:
- a component that detects a modification to a representation of electronic data, wherein the representation comprises at least one of a complete representation and a partial representation of the electronic data;
- a component that obtains a mapping between the electronic data and the representation; and
- a component that utilizes the mapping to translate the modification to the electronic data to synchronize the electronic data and the representation, wherein the modification is translated to the electronic data dynamically by automatically updating the electronic data upon commitment or explicitly by initiating a transaction on the representation to update the electronic data.

25. A synchronization system, comprising:
- means for generating a representation of electronic data, wherein the representation comprises at least one of a complete representation and a partial representation of the electronic data;
- means for associating the representation with the electronic data; and
- means for translating a modification to the representation to the electronic data to synchronize the electronic data and the representation, wherein the modification is translated to the electronic data dynamically by automatically updating the electronic data upon commitment or explicitly by initiating a transaction on the representation to update the electronic data.

* * * * *